United States Patent [19]

Williams

[11] Patent Number: 4,881,973

[45] Date of Patent: * Nov. 21, 1989

[54] LIFE SILVER RECOVERY SYSTEM

[75] Inventor: James E. Williams, Fletcher, N.C.

[73] Assignee: E. I. Du Pont de Nemours and Company, Wilmington, Del.

[*] Notice: The portion of the term of this patent subsequent to Apr. 26, 2005 has been disclaimed.

[21] Appl. No.: 151,302

[22] Filed: Feb. 1, 1988

[51] Int. Cl.$^4$ .............................................. C22B 11/04
[52] U.S. Cl. ................................ 75/118 P; 75/108; 75/109; 210/719; 210/723
[58] Field of Search .................. 75/108, 109, 118 R, 75/118 P; 210/719, 723

[56] References Cited

U.S. PATENT DOCUMENTS

| | | | |
|---|---|---|---|
| 1,527,942 | 2/1925 | Weisberg | 75/118 P |
| 2,214,765 | 9/1940 | Holzwarth | 75/109 |
| 2,292,207 | 8/1942 | Dearing | 75/118 P |
| 2,507,175 | 5/1950 | Pool | 75/118 P |
| 3,792,845 | 2/1974 | Larson et al. | 75/109 |
| 4,035,181 | 7/1977 | Fisch | 75/118 P |
| 4,110,109 | 8/1978 | Golben | 75/118 P |
| 4,213,600 | 7/1980 | Thompson, Jr. | 266/170 |
| 4,303,441 | 12/1981 | Lamisse | 75/109 |
| 4,441,697 | 4/1984 | Peterson et al. | 266/170 |
| 4,740,244 | 4/1988 | Williams | 75/109 |

FOREIGN PATENT DOCUMENTS 2106962 5/1972 France.
1353805 5/1974 United Kingdom.

Primary Examiner—Robert L. Stoll

[57] ABSTRACT

A process is described which improves the life of a silver recovery unit which employs finely divided iron and a minor amounts of a copper or cadmium salt therein by raising the pH of waste acidic photographic processing stream containing silver to be recovered. This pH increase may be accomplished using waste developer stream. An additional use of a chelating agent has been found to be beneficial.

9 Claims, No Drawings

4,881,973

LIFE SILVER RECOVERY SYSTEM

CROSS REFERENCE TO RELATED APPLICATION

This application is related to my co-pending application USSN 925,296, filed Oct. 31, 1986 now U.S. Pat. No. 4,740,244.

TECHNICAL FIELD

This invention relates to a process for improving the useful life of an element used to recover silver from waste, acidic photographic processing fluids. More particularly, this invention relates to an improved silver recovery process.

BACKGROUND OF THE INVENTION

In my co-pending patent application (USSN 925,296, filed Oct. 31, 1986) an improved silver recovery system is disclosed for the recovery of silver from waste, acidic photographic processing fluid. The fluid is passed through finely divided iron contained a minor amount of a metal salt of copper or cadmium. Substantial improvement in the amount of recoverable silver and in the flow-through characteristics is achieved. However, the useful life of the device which employs this recovery process is not as great as would be predicted from a knowledge of the amount of finely divided iron that is present therein. If all iron present were to be exchanged for silver in the processed fluids, the useable life of this device could be greatly enhanced. Such an improvement would enable the system to be more cost efficient since the user need not change the unit so often.

There is a need to further improve the process of the aforementioned co-pending application so that more of the silver present in a waste, acidic photographic processing fluid can be recovered based on the amount of iron present.

SUMMARY OF THE INVENTION

In accordance with this invention, there is provided a process for the recovery of silver from spent, waste acidic silver halide photographic processing fluid, which comprises passing the waste silver halide photographic processing fluid through finely divided iron and a metal salt taken from the group consisting of copper and cadmium wherein the ratio of iron to said metal salt is in a range from 25:1 to 4:1 by weight wherein the pH of said spent, waste acidic processing fluid is raised prior to contact with the iron and metal salt.

In another embodiment of this invention, a waste, alkaline silver halide processing fluid (e.g., waste developer) is used to raise the pH of the waste acidic silver halide photographic processing fluid and in still a more particularly preferred embodiment a chelating agent is present during recovery of the silver.

DETAILED DESCRIPTION OF THE INVENTION

A silver recovery system described in applicant's co-pending patent application Ser. No. 925,296 is useful in the present invention and is incorporated by reference herein. Such patent application discloses a silver recovery system employing a vessel inert to the photographic processing fluid from which the silver is to be recovered. The vessel has a substantially flat bottom and top and is provided with both an inlet (usually in the bottom thereof) and an outlet (usually in the top) so that the waste, acidic photographic processing fluid can flow therein. Inert materials from which this vessel can be made can include plastic, stainless steel and the like. A plate is provided within this vessel, usually located near to the inlet with the plate functioning to diffuse the fluid and thus to insure an even distribution throughout said vessel. Finely divided iron fills the vessel above the diffusion plate. Finely divided iron is employed to present a large surface area for contact with the fluid but the degree of fineness is not critical. Steel wool is an example of such starting material. A copper or cadmium salt is added to the vessel, usually just below the diffusing plate wherein the ratio of iron to the copper or cadmium salt is in a range from 25:1 to 4:1 by weight.

During operation of the recovery system described above, spent acidic, photographic processing fluid (also called a waste acidic fixer stream herein) which contains dissolved silver is passed through the finely divided iron and the copper or cadmium salt therein. Since iron is higher in the electromotive series than silver, silver deposits in the area where the iron once was and the iron then becomes the dissolved species and is passed out of the vessel. Of course, iron is cheaper than silver and it can also be more ecologically discarded. Thus, this recovery system represents a savings to the user and presents a more acceptable waste stream. This waste stream is benevolent in nature and can be more easily disposed since the majority of the dissolved silver is removed. The presence of the minor amount of copper or cadmium salt presents a distinct advantage over the prior art since higher silver recovery is possible and longer vessel life is achieved. In theory, if the iron as replaced by the silver forms iron (II) in a dissolved species, about 3.86 pounds of silver is recoverable for each pound of iron placed in the canister.

There is a need to increase the useful life of the system described in my co-pending patent application since a portion of the iron is simply dissolved in the fluid stream and is not available for replacement by silver. If all of the iron represented recoverable silver, as mentioned above, an amount up to more than three times the amount of silver could be collected since less iron charged to the recovery unit would be lost and would be available for conversion to silver.

In the present invention a higher amount of silver can be recovered for a corresponding amount of finely divided iron (and copper or cadmium salt, contained therein) by controlling pH of the silver containing fluid. As the pH of the incoming fluid stream is raised, substantially improved silver recovery can be achieved on the basis of the weight of iron employed. The pH change may be accomplished adding any well-known basic solution thereto. The basic solution, for example, may be added to the waste, acidic stream just prior to entry into the vessel or mixed with the waste material in a large tank. The important fact is not the method for lowering the acidity of this stream but the actual lowering thereof, or expressed in another manner, raising the pH of this stream.

In yet another embodiment, applicant has found that this pH range can be achieved by mixing waste developer stream (typically pH 10.0, for example) with a waste acidic fixer stream which contains dissolved silver. This embodiment is convenient and inexpensive since no additional stream needs to be made up by the user. A typical ratio is 0.2 to 0.8 gallons of waste developer per gallon of fixer. Since small amounts of other metal ions such as aluminum (III) are present in many of the waste developer streams, it is useful, and preferred, to incorporate a chelating agent within this stream to insure that these metals remain dissolved and do not precipitate because of the changed pH within the recovery vessel. The amount can easily be determined by knowledge of the amount of other metal that is present therein.

The amount of chelating agent can be readily determined as is conventional in the art. The upper pH limit of the acidic developer stream after pH adjustment is generally not greater than 7.0, and more generally not greater than 6.0. The upper limit is determined by the absence of by-products and reaction products produced as a result of the higher pH. Such upper limit can be readily determined by adjusting the pH until a value just below an acceptable pH is achieved.

A preferred chelating agent is glucono-Δ-lactone which has the following structure:

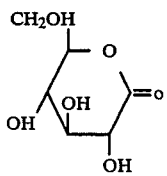

Other useful chelating agents include, for example:
(1) Ethylene diamine N,N'-tetraacetic acid in which 1,2,3 or 4 of the acid hydrogens can be replaced with alkali metal ions, and which has the following structure:

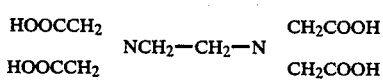

(2) Diethylenetriaminepentaacetic acid in which 1,2,3,4 or 5 of the acid hydrogens can be replaced with alkali metal ions, and which has the following structure:

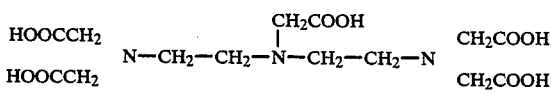

(3) Trisodium hydroxyethylethylene-diamine triacetate (similar to (1) with -CHCHOH in place of one of the acetate groups.)
(4) Other specific chelating agents for soluble metal species which may be present in the waste developer or fixer streams.

Thus, this particularly preferred mode allows the pH adjustment to be achieved with yet another waste stream with a chelating agent present, and the silver recovery system itself can be used for a still longer period of time before the user needs to replace the vessel. Thus, by the practice of this invention, the user is able not only to recover more silver per pound of iron used, for example, but also to use the vessel for a longer period of time. This fact is quite important to users such as the X-ray departments within a large hospital, for example. Here, floor space is limited, time is of the essence and equipment changes of any type can be an inefficient use of valuable hospital time and space. Silver recovery systems are usually placed near the automatic developing apparatus. As fixer is purged from the system and replaced with fresh fixer, the purged, or waste stream, is passed through the silver recovery system before being discarded. Under normal prior practice, the user may employ several prior art silver recovery units and then switch units as analysis of the effluent indicates that the unit is being exhausted. The exhausted unit may then be shipped elsewhere for silver recovery.

By employing the long-life unit of this invention, there is less need to switch units and a considerable savings in man power can be achieved. Additionally, since the recovery of silver is more efficient in itself (i.e., closer to theoretical replacement of iron with silver, for example) savings in numbers of necessary units is also achieved.

In describing the preferred embodiment of this invention, the following examples are furnished. All parts and percentages are by weight unless otherwise indicated. In these examples, Example 2 represents the best mode.

EXAMPLE 1

A canister similar in size and shape to that described in Example 1 of my co-pending application, U.S. Serial No. 925,296 filed October 31, 1986, was prepared. The canister was charged with 24 pounds of common steel wool and about 1000 grams of copper sulfate pentahydrate added thereto as a dry solid. A waste acidic fixer stream of Du Pont XMF fixer from a typical, automatic machine used in the processing of exposed, medical X-ray elements (10 gal. per hour) was admixed with a waste developer stream of Du Pont HSD developer (2 gal. per hour). The resulting mixed stream had a pH of about 5.0. This mixture was passed through the canister for about 30 days until analysis indicated that the silver ion concentration was rising. The canister was removed and the resulting silver product taken therefrom. It had an excellent, fine, solid quality with little or no evidence of black sludge. The silver product analyzed as 92% pure silver by weight and weighed 40.6 pounds. In comparison, in a canister used as control (in which the pH of the waste fixer stream was not adjusted) only 26 pounds of silver product of 92% pure silver by weight was recovered.

EXAMPLE 2

Attempts were made to increase the pH of the waste fixer stream above 5.0 by the addition of waste developer stream resulted in precipitation of metal hydroxides and a complexing agent (i.e., a chelating agent) was employed to overcome this problem. 2.25 grams glucono-Δ-lactone were added per gallon of waste fixer prior to mixing the waste developer with the waste fixer. This permitted an increased level of waste developer to be used and the pH of the resulting stream was increased to 5.6. The canister used was identical to that in Example 1. Ninety pounds of silver product of 91.7% pure silver were obtained.

EXAMPLE 3

Experiments were performed in which the final pH was varied by incorporating varying amounts of waste Du Pont HSD Developer into a stream of waste Du Pont XMF fixer. In each case, the waste fixer/developer streams were modified by the addition of 2.25 grams of glucono-Δ-lactone to complex other metal ions known to be present in the fixer. The lactone was obtained from Pfizer Inc., and was designated as "Coarse Grade, #5 4025-25L" by the manufacturer thereof. The streams were adjusted to give a measured pH as recorded in the table below. For these experiments steel wool provided by International Steel Wool Company, 1800 Commerce Road, Springfield, Ohio 45501, and designated as grade 1 was employed as the sacrificial metal. The quoted composition of the wool was:

| | |
|---|---|
| Iron | 98.9% |
| Oils | 0.2% |
| Carbon | 0.1% |
| Manganese | 0.8% |
| Phosphorous | Less than 0.1% |
| Sulfur | Less than 0.1% |
| Sulfur | Less than 0.1% |

Copper sulfate pentahydrate was added to the steel wool in a concentration similar to the concentration employed in Example 1. Two experiments were run 1 —Laboratory scale in which 30.0 grams of steel wool were added to a polyethylene bottle and pH adjusted fixer was pumped through the bottle using a peristaltic pump at 96 cubic centimeters per minute. After 3 days the experiment was terminated and the silver residue analyzed for dry quantity, and as percent silver. Also the physical condition of the solid was assessed.

2 —Large scale in which pH adjusted fixer was flowed through a 15 gallon Kodak Type 3 canister containing 10.9 kilograms of steel wool. The reaction was monitored until a silver ion breakthrough was observed in the canister effluent.

The data is considered to be consistent and is given in the table below with results converted to a 30 gram steel wool basis.

| pH | Grams Residue Per 30 Grams Wool | Weight Percent Silver | Grams Silver Per 30 Grams Iron | Lb Silver Per Lb 98.9% Iron |
|---|---|---|---|---|
| 4.3 | 33.11 | 92.0 | 30.5 | 1.03 |
| 5.0 | 46.24 | 93.0 | 43.0 | 1.45 |
| 5.12 | 89.20 | 93.3 | 83.2 | 2.80 |
| 5.48 | 81.14 | 93.9 | 76.2 | 2.57 |
| 5.60 | 112.28 | 91.7 | 103.0 | 3.47 |
| 5.67 | 113.59 | 82.8 | 94.1 | 3.17 |
| 6.03 | 105.1 | 91.4 | 96.1 | 3.24 |
| 6.53* | 96.0 | 43.95 | 42.2 | 1.43 |
| 6.98* | 83.0 | 53.8 | 44.7 | 1.51 |

*The recovered solids at these pH's was heavily contaminated with rusty debris. In contrast, at pH's 4.3 to 6.03 bright metallic silver was obtained.

No experiments were run above pH 7 because the effluent streams are known to contain ammonium salts which might evolve ammonia gas in a basic environment.

As can be seen from these experiments, the amount of silver recovered from the waste fixer stream in which the pH had been adjusted according to the teachings of this invention can be greatly increased. Above pH 6.03, the solids become heavily contaminated with rusty debris. In contrast, the solids obtained at pH 4.3–6.03 were bright, shiny silver metal.

I claim:

1. A process for the recovery of silver from spent, waste acidic silver halide photographic processing fluid which comprises passing said waste processing fluid through finely divided iron and a metal salt of copper or cadmium wherein the weight ratio of iron to said metal salt is in a range from 25:1 to 4:1 and wherein the pH of said acidic silver halide processing fluid is raised prior to contact with the iron and the metal salt.

2. The process of claim 1 wherein the pH range of said acidic fluid is raised to a value not greater than 6.0.

3. The process of claim 2 wherein the initial pH of the fluid is in a range from 4.3 to 4.4.

4. The process of claim 2 wherein the pH of said acidic fluid is raised by using waste developer.

5. The process of claim 2 wherein a copper salt is employed.

6. The process of claim 3 wherein said waste fluid contains a chelating agent.

7. The process of claim 6 wherein said chelating agent is glucono-Δ-lactone.

8. A process for the recovery of silver from spent, waste acidic silver halide photographic processing fluid which comprises passing said waste processing fluid containing a chelating agent through finely divided iron and copper sulfate wherein the pH of said acidic fluid is raised to a value not greater than 6.0 prior to contact with the iron and copper sulfate.

9. The process of claim 6 wherein said chelating agent is taken from the group consisting glucono-Δ-lactone, ethylene diamine N,N'-tetraacetic acid, diethylene triamine pentaacetic acid and trisodium hydroxyethylenediamine-triacetate.

* * * * *